Dec. 16, 1947.  R. L. WILCOX  2,432,844
METHOD OF AND MEANS FOR MAKING NUT BLANKS
Filed April 22, 1944   3 Sheets-Sheet 1
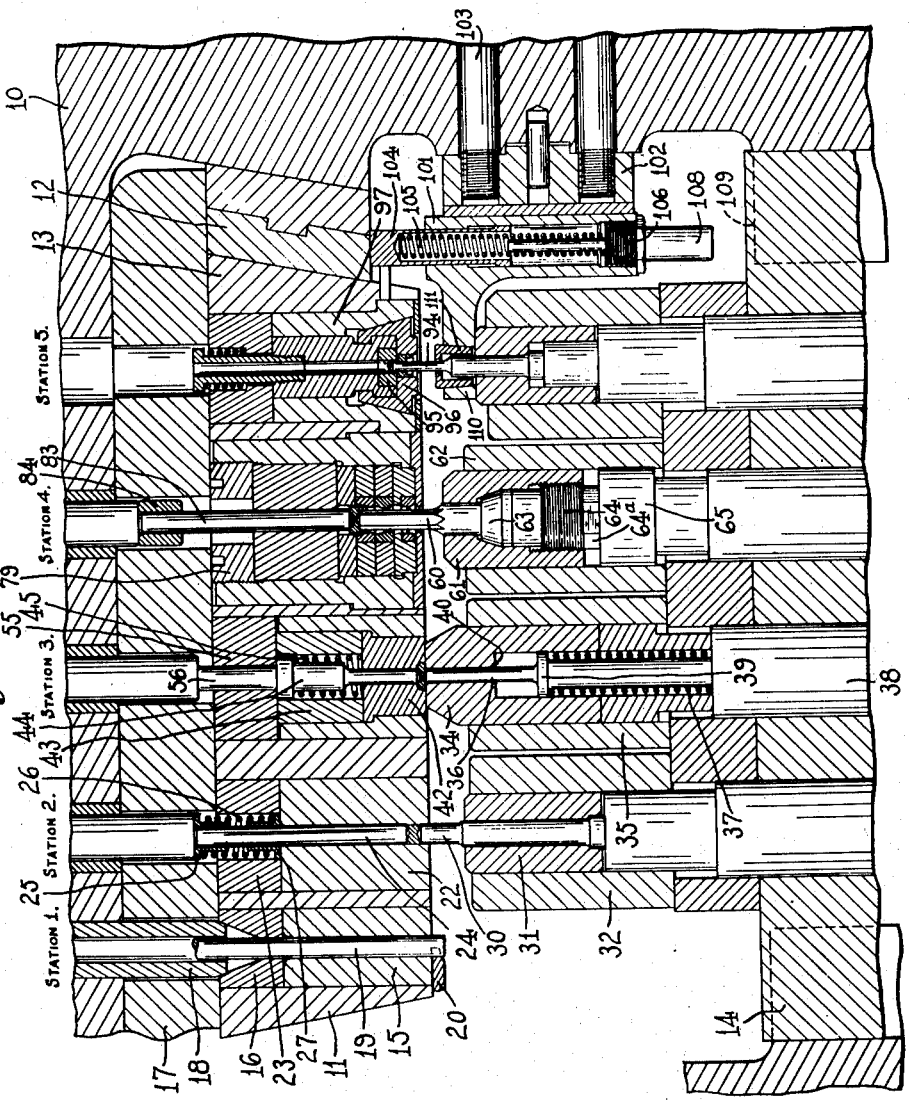

Dec. 16, 1947.     R. L. WILCOX     2,432,844
METHOD OF AND MEANS FOR MAKING NUT BLANKS
Filed April 22, 1944     3 Sheets-Sheet 2
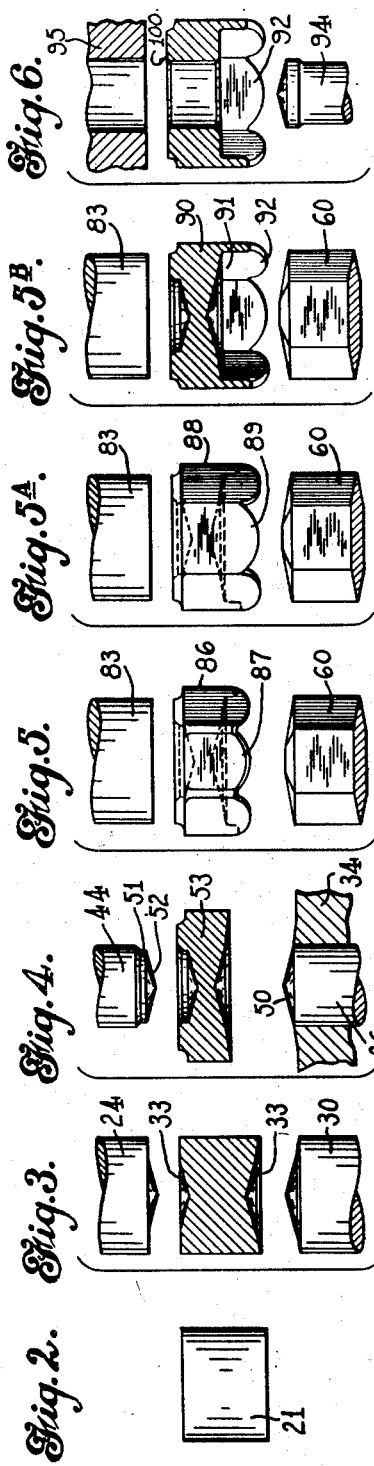
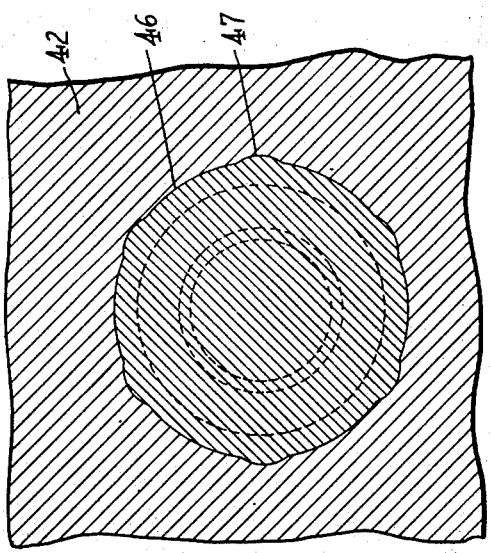
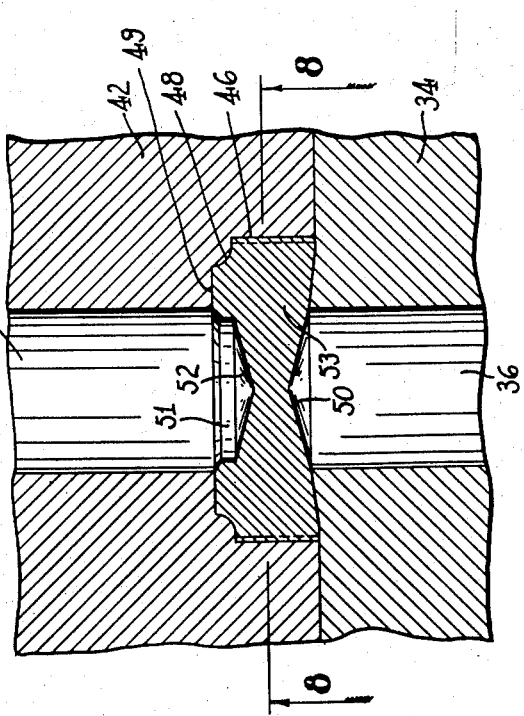

Dec. 16, 1947.  R. L. WILCOX  2,432,844
METHOD OF AND MEANS FOR MAKING NUT BLANKS
Filed April 22, 1944  3 Sheets-Sheet 3

Richard Lester Wilcox
By Rockwell Bartholow
Attorneys

Patented Dec. 16, 1947

2,432,844

UNITED STATES PATENT OFFICE 2,432,844

METHOD OF AND MEANS FOR MAKING NUT BLANKS

Richard Lester Wilcox, Waterbury, Conn., assignor to The Waterbury Farrel Foundry & Machine Company, Waterbury, Conn., a corporation of Connecticut Application April 22, 1944, Serial No. 532,222

21 Claims. (Cl. 10—86)

This invention relates to means for and method of manufacturing lock nut blanks, and, as shown, relates particularly to the manufacture of a nut blank having a hexagonal form and provided with a recess surrounded by upstanding petals, whereby these petals may be folded over a washer-like insert to secure the latter to the blank and form the completed lock nut. The invention, however, is not limited to a nut of the particular type disclosed, but is capable of application to the formation of articles of other types and forms.

In the past, nuts or nut blanks similar to those shown herein have been formed from sheet material. In some cases holes are pierced through a piece of sheet metal stock, thus producing a cylindrical blank which is then processed to produce a finished blank of the proper form. In other cases a hexagonal blank is pierced out of sheet metal stock, and thereafter by the operation of suitable dies this blank is formed with a recess at one end to receive the locking insert. In both instances the process has been a relatively tedious one in that upon one machine only a relatively small number of blanks could be produced in a given time. A second disadvantage of previous methods resides in the fact that considerable waste or scrap results, particularly from the use of sheet metal stock, for whether hexagonal blanks or round blanks are cut therefrom, there is considerable wastage.

In the present invention the finished nut blank is made from round wire or rod stock. The blank cut from this stock is of smaller diameter than the finished nut, but is somewhat thicker, so as to supply the required material. This blank is then formed while cold into a finished blank of the required shape and size. Thereafter an opening is punched through the blank, which is threaded to receive the bolt with which the nut is to be employed. This slug, which is punched from the blank when the bolt opening is formed therein, is practically the only wastage invo'ved in the process, and as the thickness of that portion of the nut through which the hole is pierced is only approximately one-half the thickness of the blank, it will be seen that the reduction in loss due to scrap is very large.

One object of the present invention is to provide a nut or nut blank from a wire rod or the like while cold and by means of pressure, wherein a socket or recess is formed in one end of the blank.

A further object of the invention is to provide a nut blank from a wire rod or the like while cold and by pressure means, the finished blank preferably having a polygonal cross section and being provided with a recess at one face thereof, the recess being surrounded by petals or walls having curved tips.

Still another object of the invention is to provide a novel method of forming a nut blank of the type described herein.

A still further object of the invention is to provide a new and improved machine for forming a nut blank of the type described herein.

Other objects of the invention consist in improved steps in the manufacture of the nut blank, such as, for example, to provide the recess in the face of the blank before piercing the opening therethrough so as to reduce the wastage to a minimum and to form the nut blank in a series of continuous operations, wherein a wire rod or the like is fed to a machine at one end thereof, or what may be described as the first station, and the finished blank is ejected at the last station.

To these and other ends the invention consists in the novel features and combinations of parts to be hereinafter described and claimed.

In the accompanying drawings:

Fig. 1 is a fragmentary sectional view of a header, upsetting machine or the like embodying my invention and which is admirably adapted to carry out my improved process;

Fig. 2 is an elevational view of the slug or workpiece cut from wire rod stock from which the finished blank is made;

Fig. 3 is a sectional view of the blank as it appears at station #2 of the machine, showing in elevation the ends of the cooperating forming tools;

Fig. 4 is a view similar to Fig. 3 showing the blank and forming tools at station #3 of the machine;

Figs. 5, 5A and 5B are views similar to Fig. 3, showing the blank at three successive stages during its passage through the forming dies at station #4, and the cooperating tools at this station;

Fig. 6 is a sectional view of the blank at station #5 after the opening has been pierced therethrough, together with an elevational view of the end of the piercing punch;

Fig. 7 is an enlarged sectional view of the die and workpiece at station #3;

Fig. 8 is a sectional view on line 8—8 of Fig. 7;

Fig. 11 shows a top plan view and a sectional view of the finished nut after the locking insert has been secured therein.

Figure 9:
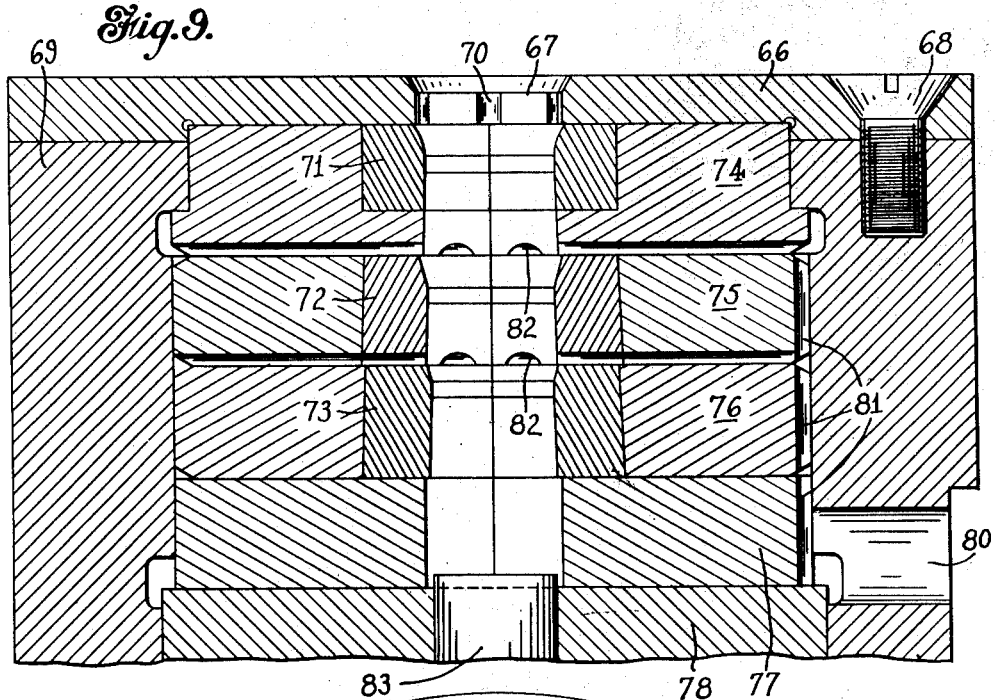
Fig. 9 is an enlarged sectional view of the group of forming dies at station #4.

The mechanism by which the nut blank is produced from wire stock by my improved means is shown as associated with a header or upsetting machine or the like of more or less conventional form. This device comprises, as will be hereinafter set forth in detail, a frame or body member having a plurality of dies therein, and a gate to which are secured, preferably adjustably, a plurality of forming punches to cooperate with the dies in the frame, the gate being movable relatively to the frame, as is usual.

As disclosed, the operations are performed at a series of stations, designated as stations 1 to 5, inclusive. At the first station a portion of the wire rod stock is severed from the rod length and transferred to station #2, where the ends of the cut-off piece are squared and each provided with a conical indentation so that one of these indentations appears at each surface. The blank is then transferred to station #3, where it is pressed into a cylindrical blank of greater diameter and of less thickness, and a plurality of axially extending ribs formed upon its outer surface, these ribs being equal in number to the corners of the completed blank, or six, for example, in a hexagonal nut. Also, at this station is formed a washer face at the lower surface of the blank, and relatively deep depressions made in its upper and lower surfaces.

The blank is then transferred to station #4, wherein it is passed through a plurality of dies in one operation. At this station the blank is passed through three dies and its exterior form is changed from substantially round to hexagonal form. In addition, its size is made progressively smaller and the body somewhat thickened. The recess in its upper surface is deepened, and relatively thin upstanding walls or petals are formed to surround this recess, the tips of which are curved from the tops of the walls toward the junction point thereof, thus forming an intermediate valley, which valley, as will be hereinafter explained, is disposed at positions about the periphery of the nut where the exterior axially extending ribs were formed at station #3.

The blank is then transferred to station #5, where the web of the blank body is pierced by a piercing punch to provide a bolt opening, which opening may later be threaded to receive the bolt.

By a comparison of the blank as shown in Figs. 2 to 6, inclusive, it will be apparent that the web or body portion thereof has been considerably reduced in thickness as it passes through the various stations of the machine, and that the indentations in its upper and lower surface, as shown particularly in Fig. 5B, leave only a relatively small amount of material to be removed by the piercing punch, and as this material is the only waste occurring in the entire process, the resulting scrap or wastage is extremely small. In cutting the round blank from the rod stock, no wastage occurs, as would occur in cutting a blank, for example, from sheet metal stock.

In Fig. 1 of the drawings I have illustrated a machine for carrying out my invention, this machine comprising a frame or body portion 10 in which is secured the die holder 11 by means of wedges 12 and 13. Cooperating with the die holder and dies therein, which will be described hereinafter, is a gate 14 carrying a plurality of tools or punches, this gate being movably associated with the frame 10 so that the tools secured to the gate may be moved toward the die holder in the usual manner.

At station #1 in the machine a cut-off die 15 is supported in the die holder upon a collar 16 and block 17, within which block is a guide sleeve 18. The wire or rod stock, designated at 19, is progressively fed through the collar 16 so that its end projects beyond the die 15 where it may be severed by a cutting tool 20. This blank or slug, thus cut off of the rod 19, becomes the workpiece from which the nut blank is made, and is shown at 21 in Fig. 2 of the drawings.

This workpiece is carried to station #2 by transfer mechanism (not shown) of the usual form. At this station a die 22 is held in the die block 11 by a sleeve 23 and block 17. Within the die 22 is slidably mounted a knock-out pin 24, this pin having secured to its inner end a shouldered collar 25, against the shoulder of which rests the inner end of a compression spring 26 acting at its outer end upon the shoulder of a similar collar 27 in the opening of the sleeve 23. As shown, the spring acts to withdraw the knock-out pin after it has been advanced by suitable mechanism to eject the blank after the latter has been operated upon.

At this station the gate is provided with a punch 30 held in a sleeve 31 within the punch holder 32, which is secured to the gate 14. It will be understood that the punch holder will usually be secured adjustably to the gate so that the punch may be correctly centered with respect to the opening in the die 22, but as this is usual in machines of somewhat similar character, illustration thereof is unnecessary. As will be understood, when the workpiece 21 is transferred to the opening in die 22 and the punch 30 is brought forward, as shown in Fig. 1, the blank will be acted upon by the punch and knock-out pin so that its ends will be squared or formed into planes at right angles to the axis of the blank, and conical indents will be formed in both ends, as shown at 33, Fig. 3.

The blank is then transferred to station #3, after being ejected from the die 22 by the knock-out pin 24, at which time it will, of course, be understood that the reciprocating gate is in its rear position so as to permit this movement of the blank. At this station the gate is provided with a punch 34 held in a holder 35 secured to the gate. Slidably mounted in the punch is a pin 36 urged outwardly by a compression spring 37 bearing at its inner end against a plug 38 in the gate. The pin is provided with an enlarged head 39 adapted to bear against a shoulder 40 at the outer end of an opening in the punch, so that, as the gate moves away from the dies the pin 36 will be carried with it after the head 39 strikes against the shoulder 40. At this station a die 42 is mounted in the die block 11, the die being held in place by a sleeve 43, and in the die and sleeve is mounted a knock-out pin 44, the pin being held in inactive position by a spring 45.

The die 42 together with the cooperating tools are shown enlarged in Fig. 7, and by reference to this figure, as well as to the sectional view of Fig. 8, it will be seen that the die opening 46 is not truly circular in cross section, but is provided with axial recesses or grooves 47, which, when the blank is forced into the die, will form axial ribs upon the exterior surface of the blank. Also it will be seen that the diameter of the die opening is considerably larger than that of the opening in the die 22 at station #2, so that, at this station, the blank will be enlarged in diameter, with a corresponding reduction in thickness or height. Also the opening in the die 42 is formed at its inner end with a fillet 48 to form a washer face 49 at an outer face of the blank. It will also be apparent that the pin 36 is provided with a pointed or conical outer end, as shown at 50, and that the knockout pin 44 is provided with a reduced end portion 51 and a conical outer end 52 to form a depression in the adjacent face of the blank.

It will be apparent that when the gate is in its rearward position so that the punch 34 is drawn away from the die 42, the pin 36 will be urged forwardly by its spring 37, so that its end will extend beyond the face of the punch. Consequently, after the blank has been moved to this station from station #2, and the gate of the machine is advanced, the end of the pin 36 will first contact the blank and will register with the indentation 33 therein so as to carry the blank into the opening in the die 42 from the transfer mechanism against the conical end of knock-out pin 44, which will register with the indentation 33 at the opposite face of the blank. The blank will then be centered within the opening in the die 42 by the ends of these pins, it being remembered that the opening in the die 42 is of greater diameter than the blank as the latter comes from station #2. The blank is, therefore, held between the conical ends of the pins 36 and 44 while the punch 34 is advancing, the compression spring 37 keeping a constant pressure against the blank at this time until the punch 34 nears the end of its stroke, at which time the rear end of the pin 36 will engage the forward end of the plug 38, after which time the pin 36 and punch 34 will move forward as one, and upset the blank into the opening in the die 42. The blank is now in the form shown at 53 in Fig. 4 of the drawings, and is provided with the washer face upon one surface thereof, with relatively deep indentations on both faces, and with axially extending ribs upon its outer surface. As the gate recedes after its operative stroke, the knock-out pin 44 is moved forward to drive the blank out of the opening of the die 42, so that it may be carried to the next station for a further operation. It will be understood that at this time the knock-out pin 44 will be retracted by its spring 45 so that its outer end will be withdrawn from the recess at the adjacent face of the blank, the spring seating the knock-out pin against a plug 55 which supports the sleeve 43, and which plug supports the knock-out pin during the operative stroke of the punch 34. A short pin 56 moves slidably in the plug 55 to operate the knock-out pin 44 to eject the blank.

The blank is now moved to station #4. The tools at this station comprise a hexagonal punch 60 mounted in a sleeve 61 carried by the punch holder 62. The punch 60 is provided with a conically shaped portion 63 cooperating with a complementally shaped portion of the interior wall of the sleeve 61, and the punch is held in place by a nut 64 screwed into the sleeve and having a head 64ª against which bears a plug 65.

The dies through which the blank is moved comprise a set or bank of three dies, shown in Fig. 9 of the drawing, the blank being drawn successively through these dies. It will be noted that a plate 66 having an opening 67 therein is secured by screws 68 to a sleeve 69, this sleeve being mounted in the die block 11 and held in place by the member 17. It will be noted that the opening 67 is provided with a plurality of axially disposed grooves or recesses 70, which are designed to register with the ribs formed upon the blank at station #3, the blank being brought to this station in such a position that the ribs will register with these grooves.

Below the plate 66 are three dies 71, 72 and 73, the openings of which register with the opening 67, which dies serve to draw the blank into its finished form. These dies are held, respectively, in die holders 74, 75 and 76, the die 73, with its holder 76, being supported by a disk 77 which is backed up by a plug 78 held as a unit in the sleeve 69 by the cylindrical nut 79, so that the die holders are rigidly held in position against the plate 66. It may here be stated that the openings in the die holders 71, 72 and 73 are progressively smaller, and are hexagonal in shape so as to draw the nut blank presented thereto into a blank of hexagonal shape, and, as will be explained later, also provide the blank with an upper recess surrounded by upstanding petals.

Figure 10:
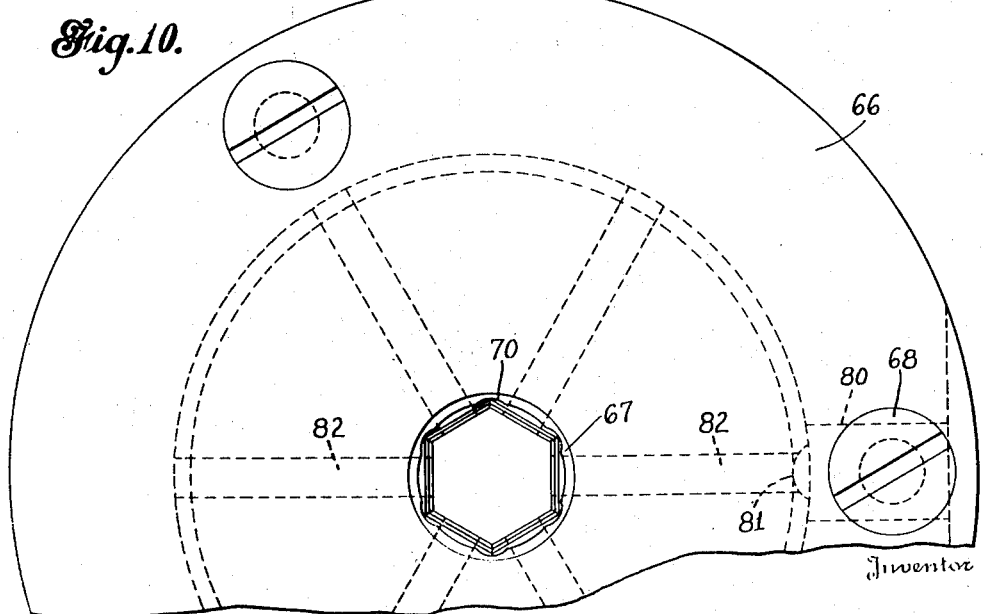
Fig. 10 is a plan view of the parts shown in Fig. 9.

Referring particularly to Figs. 9 and 10, forced lubrication is introduced through the opening 80 of the sleeve 69, and through grooves 81 in the disk 77, and in the die holders 75 and 76. The lubricant is then carried through the six channels 82, in the back faces of the die holders 74 and 75, which provides a large floating volume of lubricant to the front faces of the drawing dies 72 and 73, and when the dies are empty also squirts out through the opening in the drawing die 71, and lubricates this die.

A knock-out pin 83 is slidably mounted in an opening in the plug 78, and a sleeve 84 is riveted to the end of this pin, the nut 79 having an opening therein of sufficient size to receive this sleeve. The outer end of this knock-out pin is flat, and after the punch has forced the blank through the three drawing dies and moves rearwardly to be withdrawn from the dies, as the gate returns, the pin 60 will be advanced until the inner end of the sleeve strikes the outer end of plug 78 so as to eject the blank from the opening 67 in the plate 66 into the transfer mechanism so that it may be carried to the next station.

I have shown in Figs. 5, 5ᴬ and 5ᴮ of the drawings, the form of the cooperating ends of the hexagonal punch 60 and the knock-out pin 83, and also the nut as it appears after a passage through each of the drawing dies. As stated, the opening in each of the dies is smaller than the preceding die, and the opening of the first die is smaller across the flats of its hexagonal shape than the diameter of the substantially round blank which is fed thereto. Thus, the nut blank, while being reduced in size across the flats in passing through these dies, is somewhat thickened, particularly in the web portion, which will later be pierced, as will be presently described.

After the blank has been passed through the first die, it emerges in the form shown at 86 in Fig. 5. It will be seen that it is roughly of hexagonal form, and is provided with a recess in one face, which recess is surrounded by a hexagonal wall having petals 87 with rounded tops at its upper end. After passage through the second die, the blank is slightly smaller in size, as shown at 88, the corners are more sharply defined, and the petals 89 are slightly longer. After the blank has passed through the last die 73, it is in the form shown in Fig. 5ᴮ, wherein the body 90 is of truly hexagonal shape and a deep recess 91 has been formed in its upper surface surrounded by a hexagonal wall having petals 92 thereon. It may be noted that the hexagonal wall tapers slightly toward its outer end to permit easy withdrawal of the punch 60 therefrom. It may also be noted that the corners of the hexagonal surface of the nut are formed at the positions about the surface of the blank occupied by the ribs, and that these ribs provide additional metal at these corners to be flowed into the walls surrounding the recess 91. Particularly these ribs furnish metal to be flowed into the valleys between the petals 92, so that these valleys will be shallower and the solid portion of the walls surrounding the recess 91 be longer. It has been found that the depth of the valleys between the petals may be controlled by the amount of metal provided in the ribs 47.

The blank is now carried to station #5, where the piercing punch 94 advances with the forward motion of the gate, and the front end of this punch registers with the indentation in the bottom of the recess 91 made at station #4, and pushes the blank into a die mechanism. This mechanism is substantially the same as that shown in my prior Patent No. 1,977,163, of October 16, 1934. This die mechanism comprises a piercing die 95 about which are positioned six T-head retaining dies 96 having tapering surfaces mounted in a tapered opening in a sleeve 97. As soon as the inner end of the nut blank meets the piercing die 95, this die, together with the retainer dies 96, travel rearwardly a slight distance, and, due to the taper of the inner surface of the sleeve 97, the nut blank is prevented from lateral flow or distortion, while the piercing punch 94 pierces a hole through the web portion of the blank 90, which now becomes a pierced nut 100, shown in Fig. 6.

As the gate is retracted, the piercing punch draws the blank out of the retainer dies 96, and means are provided to strip this blank from the punch. This stripping mechanism comprises a slide 101 slidably mounted upon a block 102 secured to the frame 10 by the screws 103. Within an opening in the slide 101 is a plunger 104 against which bears a spring 105 held in place by a nut 106, and on the outer end of the slide is a post 108 designed to strike a wall 109 of the frame 10 when the gate is retracted.

Upon the slide 101 is provided an arm 110 which carries a stripper bushing 111 which surrounds the punch 94. This stripper bushing is hollow or recessed so as to permit the large-diameter portion of the punch 94 to extend as far forward as possible, and thus reduce the length of the small-diameter portion of this punch.

The plunger 104 is held in its outward position by the spring 105, and tends to bear against the wedges 12 and 13. It will be apparent that as the piercing punch is retracted with the rearward motion of the gate, the slide 101, together with the stripper bushing 111, will tend to follow the punch 94 until the gate has withdrawn to such an extent that the stop 108 strikes the wall 109 of the frame. At this time the rearward motion of the slide 101 with the arm 110 will be checked, and a continued rearward movement of the gate will draw the punch 94 through the stripper bushing to strip the pierced nut therefrom when the ends of the petals meet the outer face of the bushing, the nut having ample room to drop between the front face of the dies and the bushing. The gate carrying the punches may continue in its movement and pull the punch out entirely from the bushing, and upon its return movement, when the front face of the punch carrier again meets the back surface of the arm 110, it will bring the slide forwardly again toward the die block along with the motion of the gate.

In Fig. 11 of the drawing I have shown a lock nut which may be made from the completed blank 100, shown in Fig. 6, which represents the blank after the performance of all of the operations previously described. As shown in Fig. 11, the opening in the nut has been threaded, and a lock washer 112, which may be made of fiber, for example, has been placed in the recess 91 of the nut blank, and the petals 92 folded thereover to secure the washer in place. It will be noted that the solid portion of the walls surrounding the recess extends above the top of the washer, so that no portion of the washer is exposed on the side surface of the nut, the valleys not being sufficiently deep or low to extend below the top of the washer. While this is a preferred use of the nut blank made on my improved mechanism and with my improved process, it will, of course, be understood that the blank is not limited to the particular lock nut shown.

While I have shown a preferred embodiment of my invention and a preferred method of carrying out my improved process, it will be understood that the invention is not limited to all the details shown, nor the process limited to the particular steps described, but both are capable of modification and variation within the spirit of the invention and within the scope of the claims.

What I claim is:

1. The method of making a nut blank having flat sides and petals upstanding from the body thereof, which comprises cutting a blank from a length of circular rod stock, expanding said blank in cross-sectional area and reducing the thickness thereof while cold, and then drawing said blank through a plurality of separate dies in a continuous operation, the said dies having flat-sided openings therein to produce a flat-sided blank having a recess in one surface and petals about said recess, and then piercing an opening in the body of the blank.

2. The method of making a nut blank having flat sides and petals upstanding from the body thereof, which comprises cutting a blank from a length of circular rod stock, and drawing said blank through a plurality of dies each having progressively smaller flat-sided openings therein to draw said blank into one having flat sides and to cause the metal at the periphery of the blank to flow longitudinally thereof to form upstanding petals surrounding a recess in one face of the blank.

3. The method of making a nut blank having flat sides and petals upstanding from the body thereof, which comprises cutting a blank from a length of circular rod stock, drawing said blank through a plurality of dies each having progressively smaller flat-sided openings therein to draw said blank into one having flat sides and to cause the metal at the periphery of the blank to flow longitudinally thereof to form upstanding petals surrounding a recess in one face of the blank, and then forcing the blank out of the dies by moving it in a reverse direction.

4. The method of making a nut blank which comprises cutting a given length from solid circular rod stock of less cross-sectional area than that of the finished nut, and by pressure and while cold expanding said length of stock in area, forming flat sides thereon, and flowing the metal from the periphery of the blank in an axial direction to form, around the body of the blank, a plurality of upstanding petals the lower portions of which join to form a continuous wall.

5. The method of making a nut blank which comprises cutting a given length from solid circular rod stock of less cross-sectional area than that of the finished nut, and by pressure and while cold expanding said length of stock in area, forming flat sides thereon, flowing the metal from the periphery of the blank in an axial direction to form upstanding petals around the body of the blank, and thickening the blank body simultaneously with the formation of the flat sides thereon.

6. The method of producing a nut blank from a length of bar stock, which comprises indenting the opposite faces of a blank cut from said stock, forcing it into a die to increase the cross-sectional area thereof, and thereafter forcing the blank through a plurality of dies to form wrench faces upon the exterior thereof and a recess surrounded by upstanding petals on one face thereof.

7. The method of producing a nut blank from a length of bar stock, which comprises indenting the opposite faces of a blank cut from said stock, forcing it into a die to increase the cross-sectional area thereof, thereafter forcing the blank through a plurality of dies to form wrench faces upon the exterior thereof and a recess surrounded by upstanding petals on one face thereof, and then piercing an opening through the body of the blank, all of said operations being formed progressively and upon different blanks simultaneously in the same machine.

8. The method of producing a nut blank from a length of bar stock, which comprises indenting the opposite faces of a blank cut from said stock, forcing it into a die to increase the cross-sectional area thereof, and thereafter forcing the blank through a plurality of dies to form wrench faces upon the exterior thereof and a recess surrounded by upstanding petals on one face thereof, all of said operations being formed upon different blanks simultaneously in the same machine while the metal is cold.

9. The method of making a nut blank which comprises cutting a blank from solid bar stock, forming a plurality of axial ribs thereon, and then flowing the metal of the blank axially to form a plurality of upstanding petals at one face of the blank between the positions of said ribs with the lower portion of the wall of one petal joining those of adjacent petals on each side thereof.

10. The method of making a nut blank which comprises cutting a blank from solid bar stock, forming a plurality of axial ribs thereon, and then flowing the metal of the blank axially to form upstanding petals at one face of the blank having rounded ends and valleys therebetween lying at the positions of said ribs and with the side edges of each petal joining those of adjacent petals to form a continuous wall.

11. The method of making a nut blank which comprises cutting a blank from solid bar stock, forming a plurality of axial ribs thereon, and then flowing the metal of the blank axially to form flat wrench faces on the blank between said ribs and upstanding petals at one face of the blank projecting from said wrench faces and having bases coextensive with the upper edges of the wrench faces and forming a continuous wall about the body of the blank.

12. The method of making a nut blank which comprises cutting a blank from circular rod stock, forcing said blank into a suitable die to increase its cross-sectional area and form axially extending ribs thereon while keeping it generally circular in shape, and then drawing said blank into hexagonal form with upstanding petals on one face thereof, the petals surrounding a recess in said face and meeting at their side edges to enclose the recess.

13. The method of making a nut blank from round bar stock which includes the steps of cutting a blank from a length of stock, indenting the faces of the blank, centering the blank in a die by the indentations formed therein while enlarging its cross-sectional area by pressure thereon, and then drawing said blank through a plurality of dies having progressively smaller openings therein at one operation to form wrench faces on the exterior thereof.

14. The method of making a nut blank from round bar stock which includes the steps of cutting a blank from a length of stock, upsetting the blank to increase its cross-sectional area and then drawing said blank in one operation through a series of three dies each having a smaller opening than the preceding one thereof to reduce the cross-sectional area of the blank and form wrench faces on the exterior surface thereof and upstanding petals projecting from the wrench faces.

15. The method of making a nut blank from round bar stock which includes the steps of cutting a blank from a length of stock, upsetting the blank to increase its cross-sectional area, drawing said blank in one operation through a series of three dies each having a smaller opening than the preceding one thereof to reduce the cross-sectional area and thicken the body of the blank and form wrench faces on the exterior surface thereof, and then forcing said blank outward through the die in a reverse direction.

16. Mechanism for forming a nut blank from round bar stock, comprising means for increasing the cross-sectional area of the blank and forming axially extending ribs thereon, a series of dies, a punch for forcing said blank into said dies, and a guide plate over the openings of said dies having grooves to receive said ribs.

17. Mechanism for forming a nut blank as set forth in claim 16, wherein said die openings have flat faces the corners of which substantially register with said grooves.

18. Mechanism for forming a nut blank from round bar stock, comprising means for forming a blank having wrench faces thereon and petals upstanding from said wrench faces, said means including a frame, a gate movable thereon having punches carried thereby, dies suitably supported on the frame with which said punches cooperate, a piercing punch on said gate, a stripper movably mounted on the frame to follow the return movement of the piercing punch, and cooperating means on the frame and stripper to limit the movement of the latter to strip the blank from the piercing punch.

19. Mechanism for forming a nut blank from round bar stock, comprising means for upsetting a workpiece cut from the stock to increase the cross-sectional area thereof, a plurality of aligned dies, means for forcing the upset workpiece through said dies in a continuous movement, and means for pushing said workpiece back through the dies in a reverse direction.

20. Mechanism for forming a nut blank from round bar stock, comprising means for upsetting a workpiece cut from the stock to increase the cross-sectional area thereof, a plurality of aligned dies, said dies having flat sided openings therein and the opening in each die being smaller than that of the preceding die, and means for moving said workpiece through said dies in a continuous movement.

21. Mechanism for forming a nut blank from round bar stock, comprising means for upsetting a workpiece cut from the stock to increase the cross-sectional area thereof, a plurality of aligned dies, said dies having flat sided openings therein and the opening in each die being smaller than that of the preceding die, means for moving said workpiece through said dies in a continuous movement, and means for moving the workpiece in a reverse direction to expel it from the dies.

RICHARD LESTER WILCOX.

REFERENCES CITED

The following references are of record in the file of this patent:

UNITED STATES PATENTS

| Number | Name | Date |
|---|---|---|
| 2,069,008 | Howard | Jan. 26, 1937 |
| 1,977,162 | Wilcox | Oct. 16, 1934 |
| 2,016,296 | Rossborough | Oct. 8, 1935 |
| 1,203,823 | Ward et al. | Nov. 7, 1916 |
| 2,287,214 | Wilcox | June 23, 1942 |